United States Patent
Kawasaki

(10) Patent No.: US 9,058,145 B2
(45) Date of Patent: Jun. 16, 2015

(54) IMAGE PROCESS FOR ENSURING VISIBILITY OF COLOR IMAGE IN BLACK AND WHITE PRINTING

(71) Applicant: KYOCERA Document Solutions Inc., Osaka (JP)

(72) Inventor: Tomohiro Kawasaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/257,109

(22) Filed: Apr. 21, 2014

(65) Prior Publication Data
US 2014/0320871 A1 Oct. 30, 2014

(30) Foreign Application Priority Data
Apr. 24, 2013 (JP) ................. 2013-091826

(51) Int. Cl.
G06K 1/00 (2006.01)
G06F 3/12 (2006.01)
H04N 1/46 (2006.01)
H04N 1/60 (2006.01)

(52) U.S. Cl.
CPC ............ *G06F 3/1285* (2013.01); *G06F 3/1208* (2013.01); *G06F 3/1244* (2013.01); *H04N 1/46* (2013.01)

(58) Field of Classification Search
None
See application file for complete search history.

(56) References Cited

U.S. PATENT DOCUMENTS

| | | | |
|---|---|---|---|
| 7,110,147 B1 * | 9/2006 | Hayama et al. | 358/464 |
| 2009/0040542 A1 * | 2/2009 | Furui et al. | 358/1.9 |
| 2011/0058232 A1 * | 3/2011 | Matsuoka | 358/474 |

FOREIGN PATENT DOCUMENTS

| | | |
|---|---|---|
| JP | H10-336466 A | 12/1998 |
| JP | H11-105354 A | 4/1999 |
| JP | 2001-083955 A | 3/2001 |
| JP | 2002-040882 A | 2/2002 |
| JP | 2002-236921 A | 8/2002 |

* cited by examiner

*Primary Examiner* — Quang N Vo
(74) *Attorney, Agent, or Firm* — James W. Judge

(57) ABSTRACT

An image processing apparatus includes an image processing unit configured to set a background color in color line image data to one of white and transparent and express a line-drawing color of a line-drawing object by achromatic brightness when performing black-and-white printing based on the color line image data. The image processing unit includes: an origin setting unit configured to set a brightness of the background color to an origin on a brightness axis of a hue coordinate system in a case where the background color in the color line image data is a color other than white; and a first brightness setting unit configured to set a distance from the origin to a coordinate of the line-drawing color in the hue coordinate system as a brightness of the line-drawing object for the black-and-white printing.

12 Claims, 5 Drawing Sheets

IMAGE PROCESS FOR ENSURING VISIBILITY OF COLOR IMAGE IN BLACK AND WHITE PRINTING

CROSS-REFERENCE TO RELATED APPLICATION

This application is based upon, and claims the benefit of priority from, corresponding Japanese Patent Application No. 2013-091826 filed in the Japan Patent Office on Apr. 24, 2013, the entire contents of which are incorporated herein by reference.

BACKGROUND

Unless otherwise indicated herein, the description in this section is not prior art to the claims in this application and is not admitted to be prior art by inclusion in this section.

A user that uses drawing software such as a computer aided design (CAD) software frequently sets a background color to black or dark grey for preventing eyestrain or similar reason when the user draws a color line image.

When this color line image is printed, the background color is changed into white or transparent for reduction of the toner amount and/or due to the optical characteristics of an output paper. However, a consequent problem is that this makes it difficult to see a line-drawing color of a part of a line-drawing object.

For example, in the case where the line-drawing color is yellow, the visibility is good with the background color of black during drawing. On the other hand, the visibility is poor with the background color of white on a paper sheet after printing. In particular, when printed with a black-and-white printer or similar printer, the line-drawing color of white or yellow is converted into black and white so as to be a light black line. This light black line is hardly visible depending on the gamma characteristic and the screen characteristics. Alternatively, jaggy might become eye-catching.

In response, to improve the visibility of the line-drawing object with the line-drawing color of yellow, there is a technique that employs a high-resolution screen only in the problematic part so as to reduce the jaggy.

However, with this technique, the color of the line-drawing object itself is still light. This technique cannot ensure sufficient visibility.

Accordingly, for example, the user of CAD or similar tool changes the white line-drawing color of the line-drawing object into black and changes the yellow line-drawing color of the line-drawing object into orange for printing manually, so as to ensure visibility of the black-and-white printing.

SUMMARY

An image processing apparatus according to the disclosure includes an image processing unit configured to set a background color in color line image data to one of white and transparent and express a line-drawing color of a line-drawing object by achromatic brightness when performing black-and-white printing based on the color line image data. The image processing unit includes: an origin setting unit configured to set a brightness of the background color to an origin on a brightness axis of a hue coordinate system in a case where the background color in the color line image data is a color other than white; and a first brightness setting unit configured to set a distance from the origin to a coordinate of the line-drawing color in the hue coordinate system as a brightness of the line-drawing object for the black-and-white printing.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
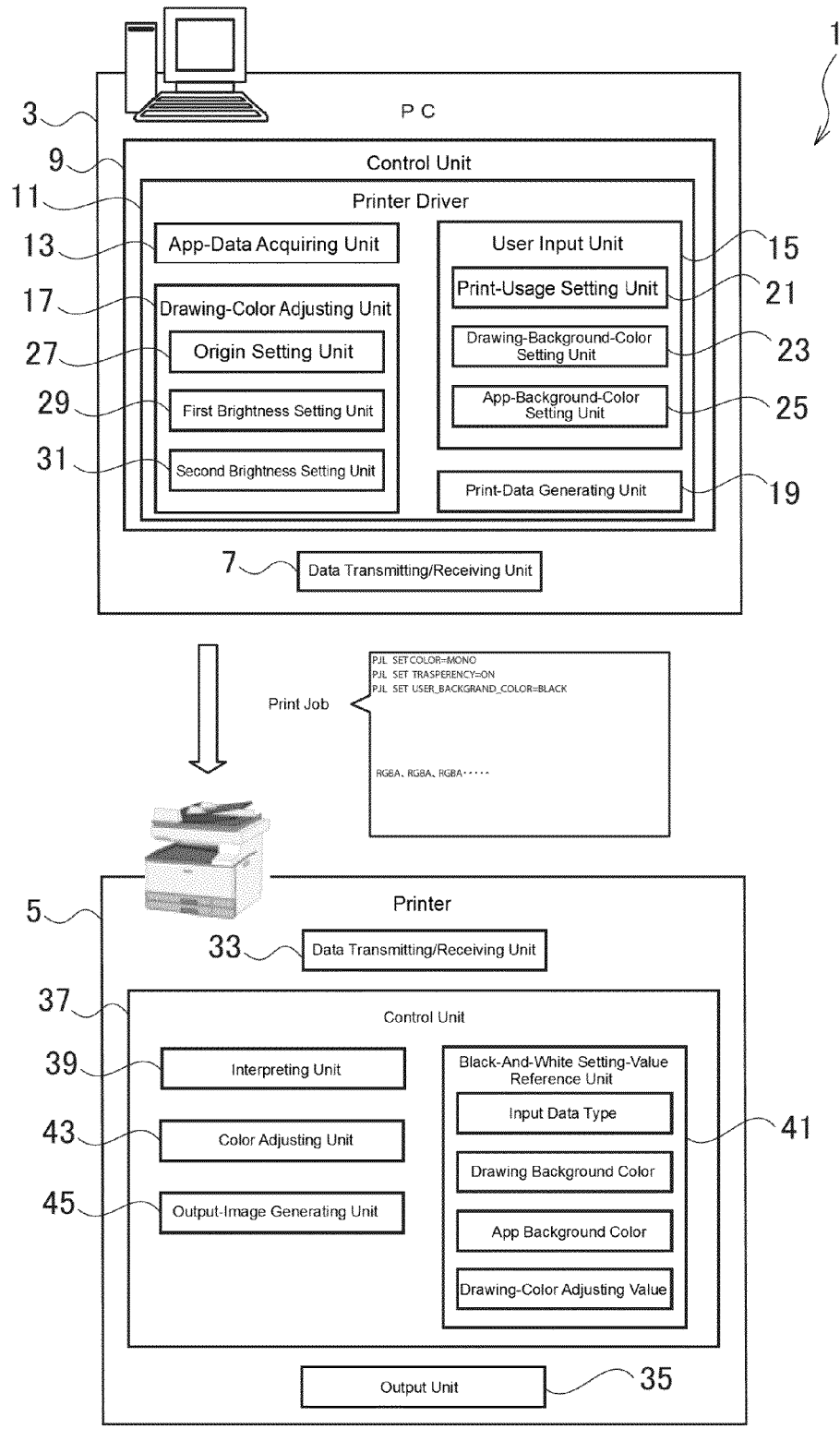
FIG. 1 is a block diagram illustrating an image forming system according to an embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The object to improve the visibility of the line-drawing object without manual operation when the black-and-white printing is performed based on the color line image data is achieved as follows. In the case where the background color in the color line image data is a color other than white, the brightness of the background color is set to the origin on the brightness axis in the hue coordinate system. Subsequently, the distance from the origin to the coordinate of the line-drawing color in the hue coordinate system is set to the brightness of the line-drawing object for black-and-white printing.

In the case where the background color in the color line image data is white, the distance on the brightness axis from white to the brightness of the line-drawing color is preferred to be set to the brightness for black-and-white printing.

The following describes embodiments according to the disclosure with reference to the drawings.

Image Forming System

FIG. 1 is a block diagram illustrating an image forming system according to the embodiment of the present disclosure. The image forming system 1 in FIG. 1 includes a personal computer 3 (hereinafter referred to as "PC 3") as an input-side device and a printer 5 as an output-side device. The PC 3 and the printer 5 are mutually connected via a network such as a Local Area Network (LAN).

The PC 3 is an information processing device, and can generate color line image data using a drafting application program such as CAD software. This PC 3 includes, at least, a data transmitting/receiving unit 7, a control unit 9, and similar unit.

The data transmitting/receiving unit 7 is an interface that transmits and receive data to/from an external terminal such as the printer 5 via a network such as LAN.

The control unit 9 has a main control function that controls each portion of the PC 3, and includes a central processing unit (CPU), a ROM, and similar member. The CPU executes a program as a main portion of a control calculation function. The ROM stores an operation program of this CPU.

In addition to the main control function, this control unit 9 executes an image processing program within the ROM or similar member so as to function as a printer driver 11. The printer driver 11 generates a print job from image data.

The printer driver 11 in this embodiment adjusts the background color within the color line image data and the line-drawing color of a line-drawing object when printing the color line image data in black and white. The color line image data includes, for example, color line image data made by CAD or similar tool or color line image data converted into a different file format such as a portable document format (PDF).

This printer driver 11 includes an app-data acquiring unit 13, a user input unit 15, a drawing-color adjusting unit 17, and a print-data generating unit 19.

The app-data acquiring unit 13 realizes an image-data acquiring function as an image-data acquiring unit. That is, the app-data acquiring unit 13 acquires the image data of a print target from the application program such as CAD software.

Figure 2:
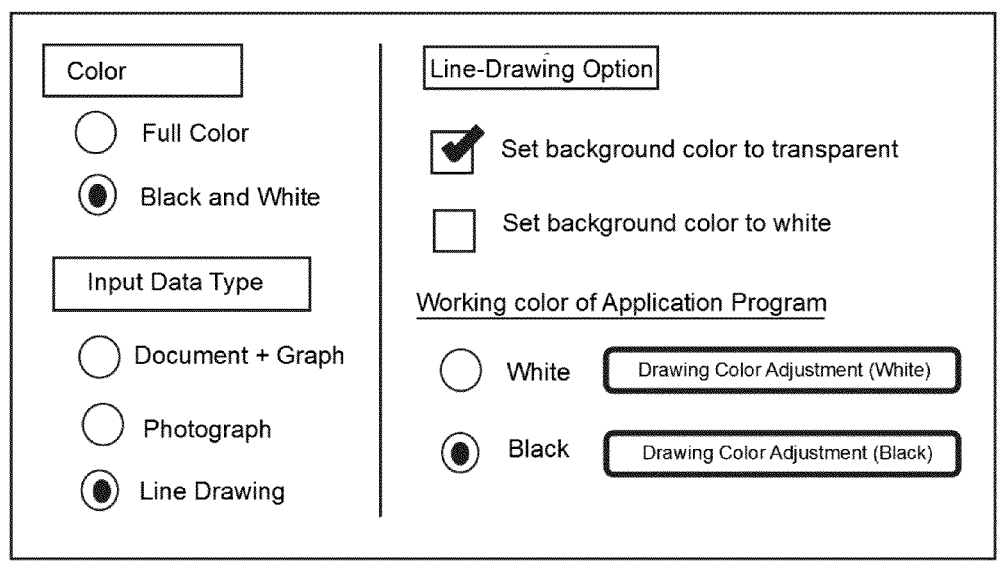
FIG. 2 is a schematic diagram illustrating an example of an image-quality setting screen according to the embodiment.

The user input unit 15 realizes an image-quality setting function as an image-quality setting unit so as to cause the user to set the image quality for printing. Specifically, the user input unit 15 displays an image-quality setting screen for printing and allows image quality setting on the image-quality setting screen using a print-usage setting unit 21, a drawing-background-color setting unit 23, and an app-background-color setting unit 25. FIG. 2 illustrates one example of the image-quality setting screen.

The print-usage setting unit 21 realizes a print-usage setting function so as to cause the user to set the type of object on the image data and obtain the printing result corresponding to the type of object.

In this embodiment, the field of "Input Data Type" on the image-quality setting screen in FIG. 2 causes the user to select one of "Document+Graph", "Photograph", and "Line Drawing" as the type of object. The reason why the type of object is selected is that the color of the object is preferred to be printed as it is without adjustment in the case where the object is a document, a graph, or a photograph.

Additionally, the print-usage setting unit 21 causes the user to set the color during printing. In this embodiment, the print-usage setting unit 21 causes the user to select "Full Color" or "Black and White" in the field of "Color" on the image-quality setting screen in FIG. 2.

The drawing-background-color setting unit 23 realizes a drawing-background-color setting function, and causes the user to set the background color (hereinafter also referred to as "drawing background color") drawn on a paper sheet during printing. In this embodiment, the drawing-background-color setting unit 23 causes the user to set the background color for drawing to white or transparent. For example, on the image-quality setting screen in FIG. 2, the drawing-background-color setting unit 23 causes the user to select "Set background color to transparent" or "Set background color to white" in the field of "Line-Drawing Option."

The app-background-color setting unit 25 realizes an app-background-color setting function, and causes the user to set the background color (hereinafter also referred to as, "working color of the application program" or "app background color") on the work environment on the application program such as CAD software, that is, the background color in the image data. Here, the background color of the work environment can also be determined from the image data.

In this embodiment, on the image-quality setting screen upper in FIG. 2, the field of "Working color of Application Program" allows selecting "White" or "Black". However, the background color of the work environment can be set to a different color such as grey and green in the application program, and this different color can be selected.

The drawing-color adjusting unit 17 realizes a drawing-color adjusting function, and operates when printing the color line image data in black and white. Accordingly, the drawing-color adjusting unit 17 determines, from the image quality setting, whether or not black-and-white printing is selected, whether or not the object is a line drawing, whether or not the drawing background color is white or transparent, and whether or not the app background color is black. This drawing-color adjusting unit 17 includes an origin setting unit 27, a first brightness setting unit 29, and a second brightness setting unit 31.

Figure 3A:
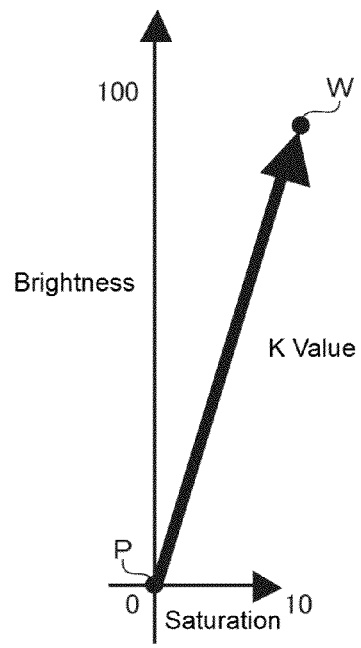
FIGS. 3A and 3B are graphical diagrams illustrating a hue coordinate system according to the embodiment.
Figure 3B:
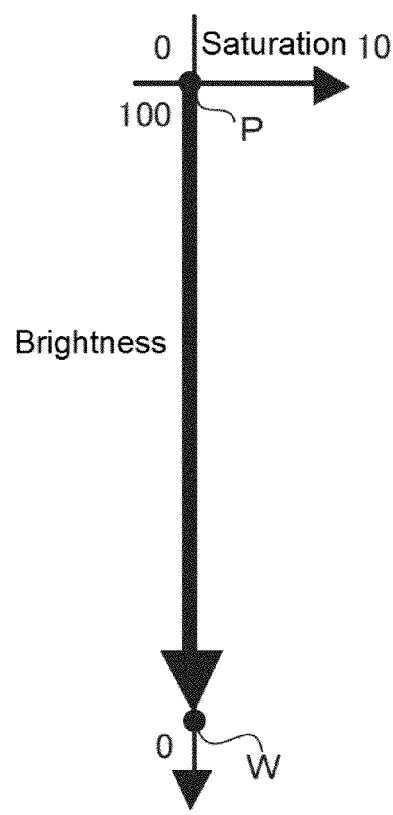

The origin setting unit 27 realizes an origin setting function, and sets the brightness of the app background color to the origin on the brightness axis of the hue coordinate system in the case where the app background color in the color line image data is a color other than white. FIGS. 3A and 3B illustrate a hue coordinate system. The vertical axis denotes brightness and the horizontal axis denotes saturation.

In this embodiment, black is set as the app background color other than white. Accordingly, as illustrated in FIG. 3A, the brightness of "0" is set to the origin P on the brightness axis.

The first brightness setting unit 29 realizes a first brightness setting function, and sets the distance from the origin P to a coordinate W of the line-drawing color of the line-drawing object in the hue coordinate system as a brightness for black-and-white printing as illustrated in FIG. 3A. That is, the first brightness setting unit 29 sets the brightness for black-and-white printing taking into consideration not only the brightness of the line-drawing color but also the saturation of the line-drawing color to adjust the line-drawing color (hereinafter also referred to as "drawing color") during printing of the line-drawing object. In this embodiment, the brightness for black-and-white printing employs the color value (K value) of black. Here, the K value is also referred to as a drawing-color adjusting value.

To obtain the K value, it is necessary to obtain the brightness and the saturation (hereinafter referred to as "coordinate brightness" and "coordinate saturation") as the coordinate W of the line-drawing color. In this embodiment, in the case where the line-drawing color is expressed as an RGB value, the coordinate brightness is set as a luminance value in the NTSC color space based on following Formula (1). The coordinate saturation is obtained as the maximum value of the RGB value.

$$\text{Coordinate Brightness} = 0.3 \times \text{RED} + 0.6 \times \text{GREEN} + 0.1 \times \text{BLUE} \quad \text{Formula (1)}$$

In Formula (1), RED, GREEN, and BLUE are respective color values of RGB. The method for obtaining the coordinate brightness and the coordinate saturation of the line-drawing color may be any method. For example, CIEL*a*b* may also be employed.

Since the K value is the distance from the origin P to the coordinate W, the K value can be obtained using the following Formula (2). In this embodiment, the K value is obtained taking into consideration 10% of the saturation. The percentage of the saturation to be taken into consideration may be any percentage, and may be set to any percentage by the user.

$$K \text{ Value} = \sqrt{((\text{Origin–Coordinate Brightness})^2 + (0.1 \times \text{Coordinate Saturation})^2)} \quad \text{Formula (2)}$$

The second brightness setting unit 31 realizes a second brightness setting function, and sets the distance on the brightness axis from white to the brightness of the line-drawing color as the brightness for black-and-white printing as illustrated in FIG. 3B in the case where the app background color in the color line image data is white. That is, in the case where the app background color is white, the saturation is not taken into consideration.

The K value in the case where the app background color is white can be obtained by the following Formula (3).

$$K \text{ Value} = \text{Origin–Coordinate Brightness Formula} \quad (3)$$

The print-data generating unit 19 realizes a print-data generating function, and generates a print job based on the image data acquired by the app-data acquiring unit 13. When the color line image data is printed in black and white, the print-data generating unit 19 generates print data for black-and-white printing based on the setting of the K value. In this case, the print-data generating unit 19 sets the app background color of the color line image data to white or transparent as the drawing background color corresponding to the image quality setting in the user input unit 15.

When setting the drawing background color to transparent, a transparent channel is added to the RGB value to make a RGBA value. For example, in the case where the app background color is black, the RGB value (0, 0, 0) is changed into a RGBA value (0, 0, 0, 255) or similar value. When setting the background color to white, the RGB value is simply changed into the RGB value (255, 255, 255) of white.

The set drawing background color is used for generating the print job for black-and-white printing together with the K value, which is obtained by the first brightness setting unit 29 or the second brightness setting unit 31, the color line image data, and the image quality setting in the user input unit 15. The generated print job is transmitted to the printer 5 side via the data transmitting/receiving unit 7.

The printer 5 is constituted of, for example, a digital multifunctional peripheral that includes a data transmitting/receiving unit 33, an output unit 35, and a control unit 37.

The data transmitting/receiving unit 33 is an interface that, similarly to the PC 3, transmits and receives data to/from an external terminal such as the PC 3 via a network such as LAN. The print job is received via this data transmitting/receiving unit 33 from the PC 3.

The output unit 35 realizes a printing function as a printing unit, and forms (prints) an image on a paper sheet based on the print job input from the PC 3. Here, the output unit 35 also allows printing based on the image data read by a scanner of the printer 5 or similar printing.

The control unit 37 has a main control function that controls each portion of the printer 5, and includes a CPU, a ROM, and similar member. The CPU executes a program as a main portion of a control calculation function. The ROM stores an operation program of this CPU.

In addition to the main control function, this control unit 37 has an image processing function that generates image data (output image data) for output based on the print job and hands over the image data to the output unit 35. That is, the control unit 37 executes the image processing program within the ROM so as to function as an interpreting unit 39, a black-and-white setting-value reference unit 41, a color adjusting unit 43, and an output-image generating unit 45.

The interpreting unit 39 realizes an interpreting function, and interprets the print job received by the data transmitting/receiving unit 33.

The black-and-white setting-value reference unit 41 realizes a black-and-white setting-value reference function, and refers to the setting values for black-and-white printing, which has been set in the print job, based on the interpretation result of the interpreting unit 39. In this embodiment, the input data type, the drawing background color, the app background color, the drawing-color adjusting value, and similar information are referenced.

The color adjusting unit 43 realizes a color adjusting function, and adjusts the drawing color of the drawing background color and the line-drawing object in accordance with the setting values for black-and-white printing referenced by the black-and-white setting-value reference unit 41 for the print job and then generates drawing data.

The output-image generating unit 45 realizes an output-image generating function, and generates the final output image data based on the drawing data from the color adjusting unit 43. The generated output image data is handed over to the output unit 35.

Image Process

Figure 4:
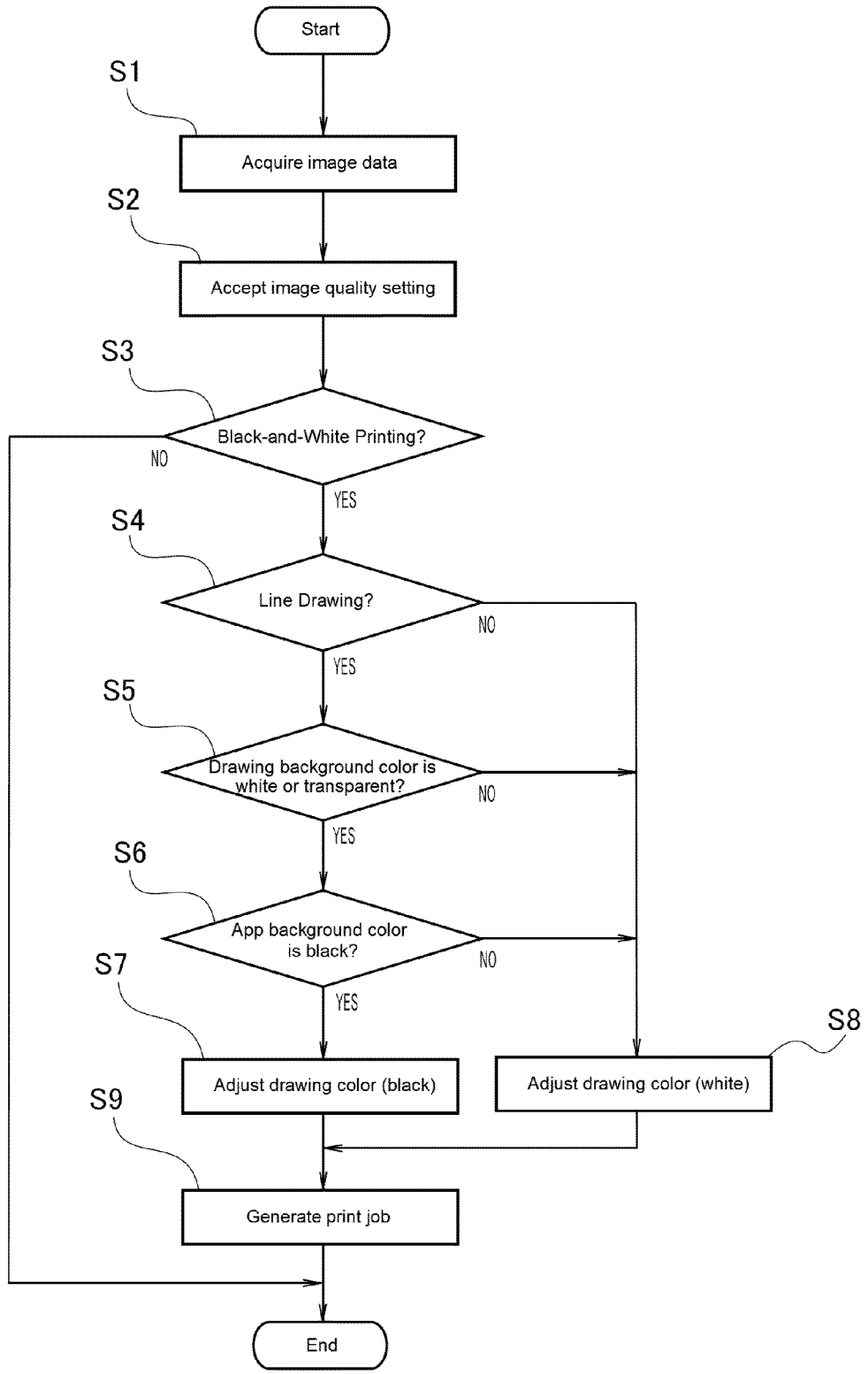
FIG. 4 is a flowchart of an image process by the image forming system according to the embodiment.

FIG. 4 is a flowchart of an image process by the image forming system 1 in FIG. 1. Here, the image process in this embodiment will be described for the case where a print job for black-and-white printing is generated based on color image data (line drawing or drawing other than line drawing) in which the app background color is black (RGB=0, 0, 0) and the line-drawing color of the line-drawing object is yellow (RGB=255, 255, 0).

The process in the flowchart of FIG. 4 is started by activating the printer driver 11 on the application program such as CAD software of the PC 3.

In Step S1, a process of "Acquire image data" is performed. In this process, the app-data acquiring unit 13 acquires the color image data of the print target from the application program. Subsequently, the process proceeds to Step S2.

In Step S2, a process of "Accept image quality setting" is performed. In this process, the user input unit 15 accepts the image quality setting from the user on the image-quality setting screen in FIG. 2. After this image quality setting has been accepted, the process proceeds to Step S3.

In Step S3, a process of "Black-and-White Printing?" is performed. In this process, the drawing-color adjusting unit 17 determines whether or not black-and-white printing is set based on the image quality setting in Step S2.

In the case where the black-and-white printing is set (YES), the process proceeds to Step S4. In the case where the color printing is set (NO), this image process is terminated. In the case where the image process is terminated, a print job for color printing is to be generated. Here, it is only necessary to generate the print job for color printing using a well-known method.

In Step S4, a process of "Line Drawing?" is performed. In this process, the drawing-color adjusting unit 17 determines whether or not the object of the color image data of the print target is a line drawing based on the image quality setting in Step S2.

In the case where the object is line drawing (YES), the process proceeds to Step S5. In the case where the object is not line drawing (NO), the process proceeds to Step S8.

In Step S5, a process of "Drawing background color is white or transparent?" is performed. In this process, the drawing-color adjusting unit 17 determines whether or not the drawing background color for the color image data is set to white or transparent based on the image quality setting in Step S2.

In the case where the drawing background color is white or transparent (YES), the process proceeds to Step S6. In the case where the drawing background color is a color other than white or transparent (NO), the process proceeds to Step S8.

In Step S6, a process of "App background color is black?" is performed. In this process, the drawing-color adjusting unit 17 determines whether or not the app background color of the color image data is black based on the image quality setting in Step S2.

In the case where the app background color is black (YES), the process proceeds to Step S7. In the case where the app background color is white (NO), the process proceeds to Step S8.

In Step S7, a process of "Adjust drawing color (black)" is performed. In this process, firstly, as illustrated in FIG. 3A, the origin setting unit 27 sets the brightness of "0" of black, which the app background color as the origin P on the brightness axis of the hue coordinate system.

Subsequently, the first brightness setting unit 29 obtains the distance (K value) from the origin P to the coordinate W of the line-drawing color (yellow) of the line-drawing object in the hue coordinate system as illustrated in FIG. 3A.

Specifically, with Formula 1 described above, the coordinate brightness of yellow (255, 255, 0) is obtained as 0.3×255×0.6+255+0.1×0=0.9×255. The coordinate saturation becomes 255, which is the maximum value of the RGB value.

Substituting these values into Formula (2) allows obtaining the K value as shown in following Formula (4).

$$K\ \text{Value} = \sqrt{((0-0.9 \times 255)^2 + (0.1 \times 255)^2)} = \sqrt{(229^2 + 25^2)} = 231 \quad \text{Formula (4)}$$

After the K value of the line-drawing object is thus obtained, the process proceeds to Step S9.

In Step S8, a process of "Adjust drawing color (white)" is performed. This process is performed not only in the case where the drawing background color is white, but also in the case where the object of the image data is not a line drawing or in the case where the drawing background color is a color other than white or transparent as illustrated in Steps S4 and S5.

In this Step S8, the second brightness setting unit 31 obtains the distance (K value) on the brightness axis from white to the brightness of yellow that is the line-drawing color as illustrated in FIG. 3B.

Specifically, with Formula 1 described above, the coordinate brightness of yellow (255, 255, 0) is obtained as 0.9×255 and the coordinate brightness of white (255, 255, 255) as the origin is obtained as 0.3×255+0.6×255+0.1×255=1.0×255.

Substituting these values into Formula (3) allows obtaining the K value as shown in following Formula (5).

$$K\ \text{Value} = (1.0 - 0.9)255 = 25 \quad \text{Formula (5)}$$

After the K value of the line-drawing object is thus obtained, the process proceeds to Step S9.

In Step S9, a process of "Generate print job" is performed. In this process, the print-data generating unit 19 sets a drawing adjustment value for the line-drawing object and generates a print job for black-and-white printing in which the drawing background color is set for the background color. As the drawing adjustment value, the K value obtained in Step S7 or S8 is set. As the drawing background color, a RGBA value (0, 0, 0, 255) is set by adding the transparent channel in case of transparent and a RGB value (255, 255, 255) is set in case of white.

The print job thus generated is transmitted to the printer 5. The printer 5 causes, based on the print job, black-and-white printing in which the visibility is improved by adjusting the drawing color of the yellow line-drawing object.

Figure 5:
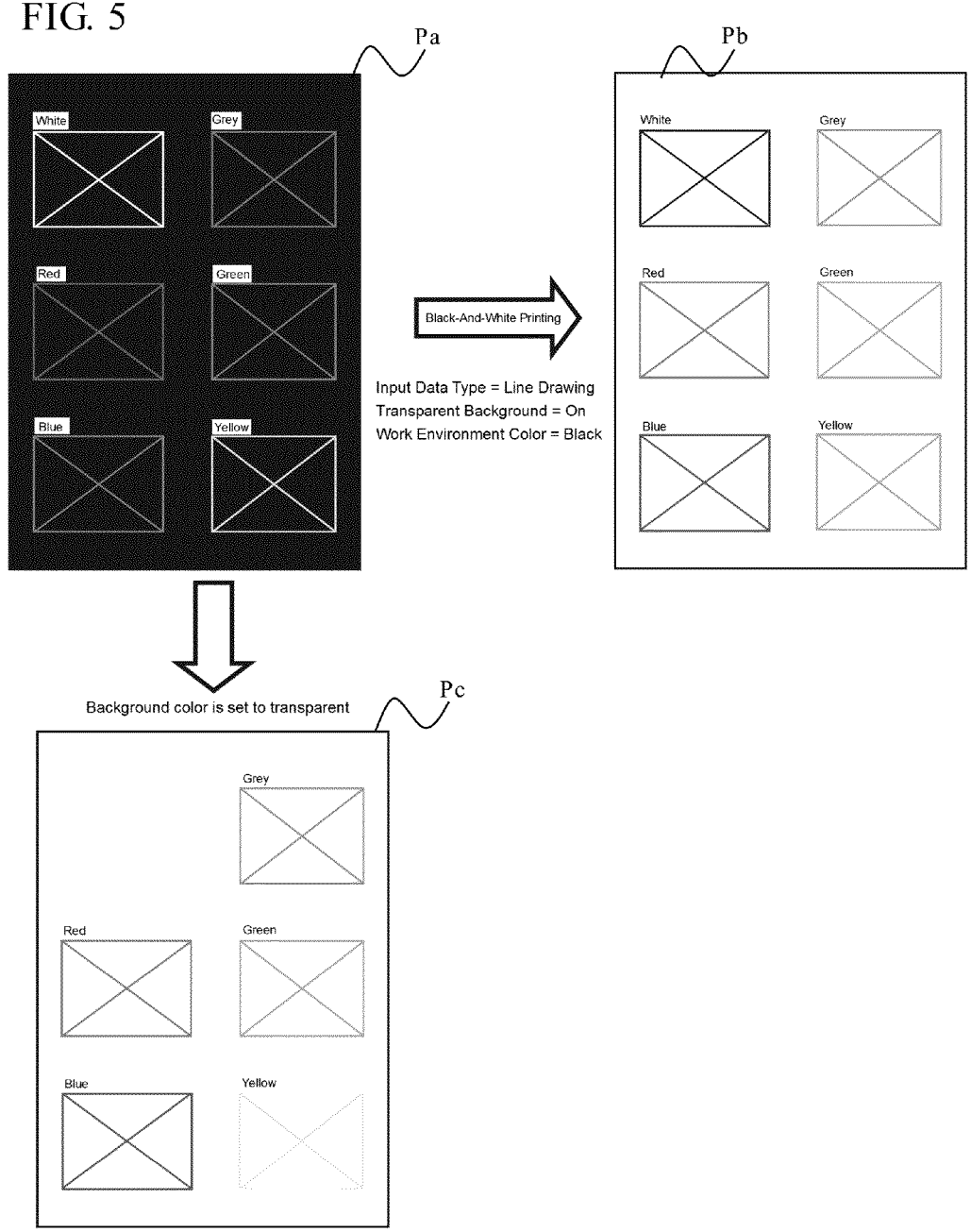
FIG. 5 is a schematic diagram illustrating respective results of black-and-white printing based on color line image data, which include a quasi-image in black-and-white of the color line image, the black-and-white printing of the embodiment, and the black-and-white printing of a comparative example.

FIG. 5 is a schematic diagram illustrating respective results of the black-and-white printings based on the color line image data, which include a quasi-image in black-and-white Pa of the color line image, the black-and-white printing Pb in the embodiment, and the black-and-white printing Pc in a comparative example. Here, the color image data has the app background color of black and line-drawing objects with respective line-drawing colors of white, red, blue, grey, green, and yellow. The black-and-white printing Pb is printed in black and white after the color line image data is processed by the above-described method in the embodiment. The black-and-white printing Pc is printed in black and white after the color line image data is processed by a method in the comparative example.

In this embodiment in FIG. 5, the drawing background color is transparent, and the drawing color of the line-drawing object is adjusted as described above. In the comparative example in FIG. 5, the drawing background color is simply made transparent, but the drawing color of the line-drawing object is not adjusted.

As is obvious from FIG. 5, in this embodiment, all the line-drawing objects including the yellow line-drawing object clearly appear on the printing result. Thus, the visibility can be improved. In contrast, in the comparative example, the white line-drawing object does not appear on the printing result. The yellow line-drawing object appears to be extremely light on the printing result. Accordingly, in the comparative example, the visibility of white and yellow is significantly reduced.

Effects of Embodiment

The PC 3 of this embodiment is an image processing apparatus for setting the app background color in the color line image data to white or transparent and expressing the line-drawing color (drawing color) of the line-drawing object by achromatic brightness when the black-and-white printing is performed based on the color line image data. The PC 3 includes the origin setting unit 27 and the first brightness setting unit 29. The origin setting unit 27 sets the brightness of the app background color to the origin P on the brightness axis of the hue coordinate system in the case where the app background color in the color line image data has a color other than white. The first brightness setting unit 29 sets the distance from the origin P to the coordinate W of the line-drawing color in the hue coordinate system as the brightness for black-and-white printing of the line-drawing object.

Accordingly, this embodiment can set the line-drawing color of the line-drawing object taking the brightness and the saturation into consideration as the drawing color for black-and-white printing when the black-and-white printing is performed based on the color line image data. This improves the visibility of the line-drawing object.

Moreover, in this embodiment, the origin P on the brightness axis of the hue coordinate system changes corresponding to the app background color other than white in the color image data. This can change the distance from the origin P to the coordinate W of the line-drawing color.

Accordingly, this embodiment allows setting the brightness for black-and-white printing taking the brightness and the saturation into consideration as the line-drawing color of the line-drawing object corresponding to the background color other than white in the color image data. This allows more reliably improving the visibility of the line-drawing object.

Additionally, this embodiment includes the second brightness setting unit 31 that sets the distance on the brightness axis from white to the brightness of the line-drawing color as the brightness for black-and-white printing in the case where the app background color in the color line image data is white.

Accordingly, this embodiment allows reliably improving the visibility of the line-drawing object even in the case where the app background color is white. Moreover, this embodiment performs simple process different from the process in the case where the app background color is a color other than white. This allows speeding up the process.

The PC 3 in this embodiment includes the print-data generating unit 19 that generates a print job for black-and-white printing based on the setting of brightness for black-and-white printing. This print job allows reliably performing the black-and-white printing in which the visibility of the line-drawing object is improved.

The image forming system 1 in this embodiment causes the output unit 35 of the printer 5 to reliably perform black-and-white printing based on the print job for black-and-white printing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus for generating color line image data using a drafting application program including computer-aided design software, the image processing apparatus including a printer driver configured to set a background color in the color line image data to one of white and transparent and express a line-drawing color of a line-drawing object by achromatic brightness when performing black-and-white printing based on the color line image data, wherein the printer driver comprises:
    an origin setting unit configured to set a brightness of the background color to an origin on a brightness axis of a hue coordinate system having the brightness axis and a saturation axis, in a case where the background color in the color line image data is a color other than white, wherein if black is set as the background color other than white, a brightness of "0" is set as the origin on the brightness axis; and
    a first brightness setting unit configured to set a distance from the origin to a coordinate of the line-drawing color in the hue coordinate system as a brightness of the line-drawing object for the black-and-white printing, in order to take into consideration not only the brightness of the line-drawing color but also saturation of the line-drawing color to adjust the line-drawing color, wherein the brightness of the line-drawing object for the black-and-white printing includes a drawing-color adjustinq value.

2. The image processing apparatus according to claim 1, wherein the printer driver further comprises a second brightness setting unit configured to set a distance on the brightness axis from the white to a brightness of the line-drawing color as the brightness for the black-and-white printing, the saturation being not taken into consideration in a case where the background color in the color line image data is white.

3. The image processing apparatus according to claim 1, further comprising a print-data generating unit configured to generate print data for the black-and-white printing based on a setting of the brightness.

4. The image processing apparatus according to claim 2, further comprising a print-data generating unit configured to generate print data for the black-and-white printing based on a setting of the brightness.

5. A non-transitory computer-readable recording medium storing a printer-driver program for an image processing apparatus that generates color line image data using a drafting application program including computer-aided design software, the printer-driver program causing a computer to function as a printer driver configured to set a background color in the color line image data to one of white and transparent and express a line-drawing color of a line-drawing object by achromatic brightness when performing black-and-white printing based on the color line image data, wherein the printer driver comprises:
    an origin setting unit configured to set a brightness of the background color to an origin on a brightness axis of a hue coordinate system having the brightness axis and a saturation axis, in a case where the background color in the color line image data is a color other than white, wherein if black is set as the background color other than white, a brightness of "0" is set as the origin on the brightness axis; and
    a first brightness setting unit configured to set a distance from the origin to a coordinate of the line-drawing color in the hue coordinate system as a brightness of the line-drawing object for the black-and-white printing, in order to take into consideration not only the brightness of the line-drawing color but also a saturation of the line-drawing color to adjust the line-drawing color, wherein the brightness of the line-drawing object for the black-and-white printing includes a drawing-color adiustinq value.

6. The non-transitory computer-readable recording medium according to claim 5, the printer-driver program further causing the computer to function as:
    a second brightness setting unit configured to set a distance on the brightness axis from the white to a brightness of the line-drawing color as the brightness for the black-and-white printing, the saturation being not taken into consideration in a case where the background color in the color line image data is white.

7. The non-transitory computer-readable recording medium according to claim 5, the image processing program further causing the computer to function as:
    a print-data generating unit configured to generate print data for the black-and-white printing based on a setting of the brightness.

8. The non-transitory computer-readable recording medium according to claim 6, the image processing program further causing the computer to function as:
    a print-data generating unit configured to generate print data for the black-and-white printing based on a setting of the brightness.

9. An image processing method via a printer driver in an image processing apparatus for generating color line image data using a drafting application program including computer-aided design software, the method comprising:
    setting a background color in the color line image data to one of white and transparent and express a line-drawing color of a line-drawing object by achromatic brightness when performing black-and-white printing based on the color line image data;

setting a brightness of the background color to an origin on a brightness axis of a hue coordinate system having the brightness axis and a saturation axis, in a case where the background color in the color line image data is a color other than white, wherein if black is set as the background color other than white, a brightness of "0" is set as the origin on the brightness axis; and setting a distance from the origin to a coordinate of the line-drawing color in the hue coordinate system as a brightness of the line-drawing object for the black-and-white printing, in order to take into consideration not only the brightness of the line-drawing color but also a saturation of the line-drawing color to adjust the line-drawing color, wherein the brightness of the line-drawing object for the black-and-white printing includes a drawing-color adjusting value.

10. The image processing method according to claim 9, further comprising setting a distance on the brightness axis from the white to a brightness of the line-drawing color as the brightness for the black-and-white printing, the saturation being not taken into consideration in a case where the background color in the color line image data is white.

11. The image processing method according to claim 9, further comprising generating print data for the black-and-white printing based on a setting of the brightness.

12. The image processing method according to claim 10, further comprising generating print data for the black-and-white printing based on a setting of the brightness.

* * * * *